(12) United States Patent
Han et al.

(10) Patent No.: US 10,726,806 B2
(45) Date of Patent: Jul. 28, 2020

(54) DISPLAY CONTROL METHOD, FEEDBACK CIRCUIT, DISPLAY DEVICE AND IC CIRCUIT

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wenchao Han, Beijing (CN); Wei Sun, Beijing (CN); Dong Chen, Beijing (CN); Lingyun Shi, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/032,628

(22) Filed: Jul. 11, 2018

(65) Prior Publication Data
US 2019/0066624 A1 Feb. 28, 2019

(30) Foreign Application Priority Data
Aug. 24, 2017 (CN) .......................... 2017 1 0736586

(51) Int. Cl.
*G09G 3/36* (2006.01)
*G02F 1/13357* (2006.01)
(Continued)

(52) U.S. Cl.
CPC ....... *G09G 3/3696* (2013.01); *G02F 1/13338* (2013.01); *G02F 1/133611* (2013.01);
(Continued)

(58) Field of Classification Search
CPC .......... G09G 3/32; G09G 3/36; G09G 3/3648; G09G 3/3696; G02F 2201/121; G02F 1/133611
(Continued)

(56) References Cited

U.S. PATENT DOCUMENTS 7,768,490 B2 * 8/2010 Huang ................. G09G 3/3614
345/100
2007/0182909 A1 * 8/2007 Kim ...................... G02F 1/1345
349/149
(Continued)

FOREIGN PATENT DOCUMENTS

CN 1982957 A 6/2007
CN 104036743 A 9/2014
(Continued)

OTHER PUBLICATIONS

First Office Action for Chinese Patent Application No. 201710736586.1 dated Dec. 31, 2019.

*Primary Examiner* — Calvin C Ma
(74) *Attorney, Agent, or Firm* — Calfee, Halter & Griswold LLP

(57) ABSTRACT

A display control method, a feedback circuit, a display device and an IC circuit are disclosed. The display control method is applied in the display device. The display control method includes: selecting two adjacent common electrodes of a plurality of common electrodes; collecting voltages of the two adjacent common electrodes; comparing the collected voltages of the two adjacent common electrodes and obtaining a comparison result. When the comparison result meets a preset condition, the method further includes compensating input voltages of pixel units in two pixel unit rows of a plurality of pixel unit rows corresponding to the two adjacent common electrodes based on the comparison result,
(Continued)

so as to enable the voltages applied on the pixel units in the two pixel unit rows to be consistent.

13 Claims, 3 Drawing Sheets

(51) Int. Cl.
    *G02F 1/1333*     (2006.01)
    *G02F 1/1362*     (2006.01)

(52) U.S. Cl.
    CPC ......... *G09G 3/3648* (2013.01); *G02F 1/1362* (2013.01); *G02F 2201/121* (2013.01); *G09G 2320/0233* (2013.01); *G09G 2354/00* (2013.01)

(58) Field of Classification Search
    USPC .............................................. 345/84, 87, 690
    See application file for complete search history.

(56) References Cited

U.S. PATENT DOCUMENTS

| | | | |
|---|---|---|---|
| 2009/0015528 A1* | 1/2009 | Sheu | G09G 3/3655 345/87 |
| 2015/0348488 A1 | 12/2015 | Wu | |
| 2017/0139523 A1 | 5/2017 | Chang et al. | |

FOREIGN PATENT DOCUMENTS

| | | |
|---|---|---|
| CN | 104157251 A | 11/2014 |
| CN | 104376829 A | 2/2015 |
| CN | 105976782 A | 9/2016 |

\* cited by examiner

DISPLAY CONTROL METHOD, FEEDBACK CIRCUIT, DISPLAY DEVICE AND IC CIRCUIT

CROSS REFERENCE OF RELATED APPLICATION

The present application claims the priority of the Chinese patent application No. 201710736586.1 filed on Aug. 24, 2017, which is entirely incorporated herein by reference.

TECHNICAL FIELD

This disclosure relates to the field of liquid crystal display technology, particularly to a display control method, a feedback circuit, a display device and an IC circuit.

BACKGROUND

Relative to previous methods of arranging a touch panel on a liquid crystal panel, researches on integration of the touch panel and the liquid crystal panel become more and more popular. The integration of the touch panel and the liquid crystal panel includes "In-cell" method and "On-cell" method. The In-cell method refers to a method of embedding a touch panel function into liquid crystal pixels. The On-cell method refers to a method of embedding a touch panel function between a color filter substrate and a polarizer.

At the present phase, it shows that the market share ratio of the In-cell technology increases progressively year by year. However, the 120 Hz timing scanning scheme of the In-cell solution always has a fixed problem about stripes. Particularly in the event of reloading an image, undesirable stripes are visible for naked eyes, which seriously influences the product performance.

SUMMARY

According to an aspect of the present disclosure, a display control method applied in a display device is provided. The display device comprises a plurality of pixel unit rows and a plurality of common electrodes connected with the plurality of pixel unit rows correspondingly. Each pixel unit row comprises a plurality of pixel units. The display control method can comprise: selecting two adjacent common electrodes of the plurality of common electrodes, collecting voltages of the two adjacent common electrodes, comparing the collected voltages of the two adjacent common electrodes and obtaining a comparison result, when the comparison result meets a preset condition, compensating input voltages of pixel units in two pixel unit rows of the plurality of pixel unit rows corresponding to the two adjacent common electrodes based on the comparison result, so as to enable the voltages applied on the pixel units in the two pixel unit rows to be consistent.

In an embodiment, the method can further comprise: when the comparison result does not meet the preset condition, reselecting another two adjacent common electrodes of the plurality of common electrodes, and performing the collecting step, the comparing step and the compensating step.

In an embodiment, comparing the collected voltages of the two adjacent common electrodes and obtaining a comparison result can comprise calculating a difference value of the voltages of the two adjacent common electrodes.

In an embodiment, compensating input voltages of pixel units in two pixel unit rows of the plurality of pixel unit rows corresponding to the two adjacent common electrodes based on the comparison result can comprise compensating input voltages of data signal input ends of pixel units in the two pixel unit rows corresponding to the two adjacent common electrodes based on the difference value of the voltages.

In an embodiment, compensating input voltages of pixel units in two pixel unit rows of the plurality of pixel unit rows corresponding to the two adjacent common electrodes based on the comparison result can comprise compensating input voltages of pixel units in one of the two pixel unit rows, or compensating input voltages of pixel units in the two pixel unit rows simultaneously.

In an embodiment, the preset condition is that, the difference value of the voltages of the two adjacent common electrodes is non-zero, or, an absolute value of the difference value of the voltages of the two adjacent common electrodes is within a predetermined range.

In an embodiment, the predetermined range is between 0.3V and 5V.

According to another aspect of the present disclosure, a feedback circuit applied in a display device is provided. The display device comprises a plurality of pixel unit rows and a plurality of common electrodes connected with the plurality of pixel unit rows correspondingly. Each pixel unit row comprises a plurality of pixel units. The feedback circuit can comprise: a collecting part configured to select two adjacent common electrodes of the plurality of common electrodes, and collect voltages of the two adjacent common electrodes; a comparing part configured to compare the collected voltages of the two adjacent common electrodes and obtain a comparison result; a compensating part configured to, when the comparison result meets a preset condition, compensate input voltages of pixel units in two pixel unit rows of the plurality of pixel unit rows corresponding to the two adjacent common electrodes based on the comparison result, so as to enable the voltages applied on the pixel units in the two pixel unit rows to be consistent.

In an embodiment, the collecting part can be further configured to, when the comparison result does not meet the preset condition, reselect another two adjacent common electrodes of the plurality of common electrodes, and collect voltages of the reselected other two adjacent common electrodes.

In an embodiment, comparing the collected voltages of the two adjacent common electrodes can comprise calculating a difference value of the voltages of the two adjacent common electrodes.

In an embodiment, the compensating part is connected with data signal input ends of the plurality of pixel units. The compensating part is configured to compensate input voltages of data signal input ends of pixel units in two pixel unit rows of the plurality of pixel unit rows corresponding to the two adjacent common electrodes based on the difference value of the voltages, so as to enable the voltages applied on the pixel units in the two pixel unit rows to be consistent.

In an embodiment, the compensating input voltages of pixel units in two pixel unit rows of the plurality of pixel unit rows corresponding to the two adjacent common electrodes based on the comparison result can comprise compensating input voltages of pixel units in one of the two pixel unit rows, or compensating input voltages of pixel units in the two pixel unit rows simultaneously.

In an embodiment, the preset condition is that, the difference value of the voltages of the two adjacent common electrodes is non-zero, or, an absolute value of the difference value of the voltages of the two adjacent common electrodes is within a predetermined range.

According to a further aspect of the present disclosure, a display device is provided. The display device can comprise: a plurality of pixel unit rows, each pixel unit row comprising a plurality of pixel units; a plurality of common electrodes connected with the plurality of pixel unit rows correspondingly; and the feedback circuit as stated above. The plurality of pixel units perform display based on the compensation voltages inputted by the feedback circuit.

According to yet another aspect of the present disclosure, an IC circuit is provided. The IC circuit comprises the feedback circuit as stated above.

DETAILED DESCRIPTION

In order to enable the above objects, features and advantages of the present disclosure to be more apparent and easy to understand, the present disclosure will be explained below in details in conjunction with the drawings and the embodiments.

Figure 1:
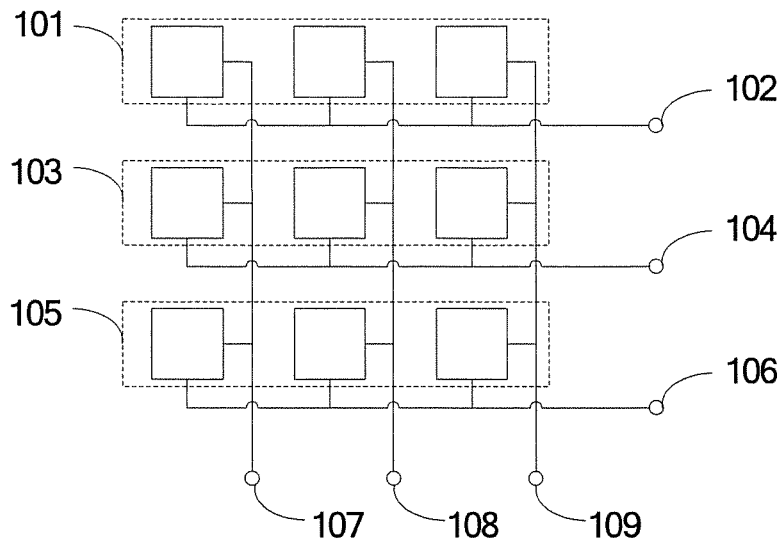
FIG. 1 shows a structural schematic view of a display device according to the related art.

FIG. 1 shows a structural schematic view of a display device according to the related art. As shown in FIG. 1, the display device comprises a plurality of pixel unit rows 101, 103, 105, each pixel unit row comprising a plurality of pixel units. The display device further comprises common electrodes 102, 104, 106 connected with the plurality of pixel unit rows correspondingly.

In this embodiment, voltages on pixel units in each pixel unit row are affected by a common electrode corresponding to the pixel unit row. Since voltages of the common electrodes may be different when the display device switches between a display mode and a touch mode, voltages applied on the corresponding pixel unit rows by them are also be different, such that display brightnesses of different pixel unit rows will be different when the display device switches between the display mode and the touch mode. If voltages of two adjacent common electrodes (e.g., 102 and 104) are different when the display device switches between the display mode and the touch mode, as a result, display brightnesses of two adjacent pixel unit rows (in this example, 101, 103) corresponding to them will be different, thereby resulting in stripes.

In addition, as shown in FIG. 1, the display device further comprises a plurality of data signal input ends 107, 108, 109 corresponding to a plurality of pixel unit columns, each data signal input end being configured to control voltages of pixel units in a pixel unit column corresponding to it.

Figure 2:
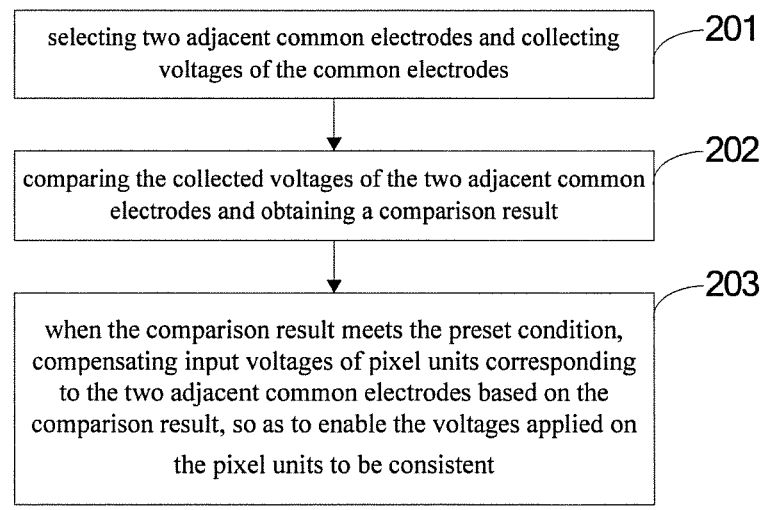
FIG. 2 shows a flow chart of a display control method according to an embodiment of the present disclosure.

FIG. 2 shows a flow chart of a display control method according to an embodiment of this disclosure. The display control method can be applied to the display device as shown in FIG. 1.

As shown in FIG. 2, the display control method can comprise: step 201, selecting two common electrodes corresponding to two adjacent pixel unit rows, and collecting voltages of the two common electrodes.

In this embodiment, the selecting two common electrodes corresponding to two adjacent pixel unit rows and collecting voltages of the two common electrodes can comprise, for example, selecting common electrodes 102 and 104, and collecting voltages of the common electrodes 102 and 104; or, selecting common electrodes 104 and 106, and collecting voltages of the common electrodes 104 and 106. The collecting manner is not defined specifically in embodiments of the present disclosure, and can be set based on actual conditions.

As shown in FIG. 2, the display control method can further comprise step 202, comparing the collected voltages of the two common electrodes and obtaining a comparison result.

In this embodiment, after the voltages of the two common electrodes are collected, the two voltages are compared and a comparison result is obtained. Specifically, the comparing the collected voltages of the two common electrodes can comprise calculating a difference value of the voltages of the two common electrodes. For example, if the collected voltages of the two common electrodes 102 and 104 are −1V and −0.5V, the difference value of the voltages of the common electrodes 102 and 104 is calculated and a comparison result that the voltage of the common electrode 104 is 0.5V larger than the voltage of the common electrode 102 is obtained.

As shown in FIG. 2, the display control method can further comprise step 203, when the comparison result meets a preset condition, compensating input voltages of pixel units in two pixel unit rows corresponding to the two common electrodes based on the comparison result, so as to enable the voltages applied on the pixel units in the two pixel unit rows to be consistent (e.g., identical).

In this embodiment, the preset condition can be that, a difference value between voltages of two adjacent common electrodes is non-zero, and can also be that an absolute value of the difference value between the voltages of the two adjacent common electrodes is within a predetermined range. In one embodiment, the predetermined range is between 0.3V and 5V. When the comparison result meets the preset condition, it indicates that there is obvious difference between the voltages of the two adjacent common electrodes, which may influence the display brightnesses of the two adjacent pixel unit rows. In such a case, input voltages of pixel units in two pixel unit rows corresponding to the two adjacent common electrodes can be compensated based on the comparison result, so as to enable the voltages applied on the pixel units in the two pixel unit rows to be consistent. In an embodiment, assume that the collected voltages of the two adjacent common electrodes 102 and 104 are −1V and −0.5V respectively, the voltage at two ends of the pixel unit in the pixel unit row 101 corresponding to the common electrode 102 is 3V, and the voltage at two ends of the pixel unit in the pixel unit row 103 corresponding to the common electrode 104 is 3.5V. Thus, the display brightnesses of the pixel units in the two pixel unit rows 101 and 103 are different due to their different voltages. In such a case, according to the present disclosure, the input voltages of the pixel units in the pixel unit rows 101 and 103 can be compensated based on the voltage difference value 0.5V between the common electrodes 102 and 104. In an embodiment, only the input voltages of the pixel units in the pixel unit row 103 can be compensated, so as to enable the voltage at the two ends of the pixel unit in the pixel unit row 103 and the voltage at the two ends of the pixel units in the pixel unit row 101 to be consistent and to be both 3V. In another embodiment, only the input voltages of the pixel units in the pixel unit row 101 can be compensated, so as to enable the voltage at the two ends of the pixel unit in the pixel unit row 101 and the voltage at the two ends of the pixel unit in the pixel unit row 103 to be consistent and to be both 3.5V. The two embodiments both enable the display brightnesses of the pixel units in the two pixel unit rows 101 and 103 to be the same finally, so as to avoid stripes.

In an embodiment, the voltage compensating manner can comprise compensating the input voltage of the data signal input end of the pixel unit based on the voltage difference value. Continuing the above example, the voltage difference value of the common electrodes 102 and 104 is 0.5V. In such a case, a voltage of 0.5V can be compensated to the pixel units in the pixel unit row 103 through the data signal input ends 107, 108, 109 or a voltage of −0.5V can be compensated to the pixel units in the pixel unit row 101 through the data signal input ends 107, 108, 109. The specific compensating end is not defined specifically in the embodiments of the present disclosure, and can be set based on actual conditions.

Figure 3:
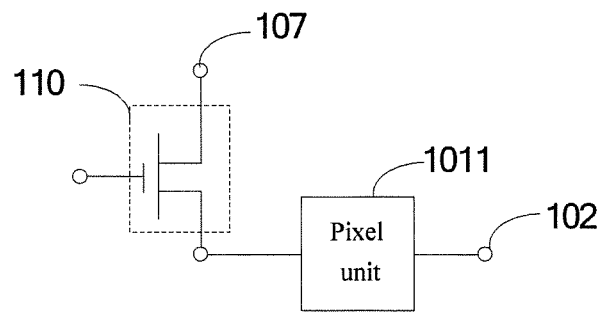
FIG. 3 shows a schematic view of a connection relationship of a pixel unit according to an embodiment of the present disclosure.

FIG. 3 shows a schematic view of a connection relationship of a pixel unit according to an embodiment of the present disclosure. FIG. 3 explains the connection relationship of the pixel unit by taking one pixel unit 1011 in the pixel unit row 101 as the example. One end of the pixel unit 1011 is connected to the common electrode 102, and the other end thereof is connected to a switch transistor 110 which controls ON and OFF of the pixel unit 1011. The data signal input end 107 for the pixel unit 1011 is connected to a first electrode of the switch transistor 110. When a voltage of the pixel unit 1011 is compensated through the data signal input end 107, the compensation voltage is applied on the first electrode of the switch transistor 110. After the switch transistor 110 is turned on, the compensation voltage applied on the first electrode of the switch transistor 110 is transmitted to a second electrode (i.e., an electrode connected with the pixel unit) of the switch transistor 110, so as to realize voltage compensation to the pixel unit 1011.

Returning to FIG. 2, when the comparison result does not meet the preset condition, another two adjacent common electrodes are reselected, and the step of collecting voltages of the two adjacent common electrodes and the steps of comparing the collected voltages of the two adjacent common electrodes and obtaining a comparison result are performed again. For example, assume that the preset condition is that a difference value of voltages of two adjacent common electrodes is non-zero, and the voltage difference value of the common electrodes 102 and 104 is zero. In such a case, the comparison result of the voltages of the common electrodes 102 and 104 will not meet the preset condition. At this time, according to the present disclosure, another two adjacent common electrodes for example 104 and 106 will be reselected, and voltages of the common electrodes 104 and 106 will be collected, and then the collected voltages will be compared to obtain a comparison result. Further, when the comparison result meets the preset condition, input voltages of pixel units in two pixel unit rows corresponding to the other two common electrodes are compensated based on the comparison result, so as to enable the voltages applied on the pixel units in the two pixel unit rows to be consistent. When the comparison result does not meet the preset condition, it indicates that the voltages of the two adjacent common electrodes are relatively approximate, which would not influence the display brightnesses of the pixel units in the two adjacent pixel unit rows and thus would not produce stripes. In such a case, another two adjacent common electrodes will be reselected again and the above steps will be repeated.

To sum up, the display control method according to an embodiment of the present disclosure can comprise selecting and collecting voltages of two adjacent common electrodes; comparing the collected voltages of the two adjacent common electrodes and obtaining a comparison result; when the comparison result meets a preset condition, compensating input voltages of pixel units in two pixel unit rows corresponding to the two adjacent common electrodes based on the comparison result, so as to enable the voltages applied on the pixel units in the two pixel unit rows to be consistent. Through the embodiment of the present disclosure, after compensation, the voltages at the two ends of the pixel units in the two adjacent pixel unit rows will become consistent, so as to enable the display brightnesses of the pixel units in the two adjacent pixel unit rows to be the same, thereby avoiding stripes.

It should be noted that for the sake of simplicity, the embodiments of the preceding methods are all described as combinations of a series of actions. However, the skilled person in the art should be aware that the present disclosure is not limited by the order of the actions described. According to the present disclosure, some steps can be performed in other orders or simultaneously. Secondly, the skilled person in the art should also be aware that the actions involved in the embodiments described in the Description are not necessarily essential for the present disclosure.

Figure 4:
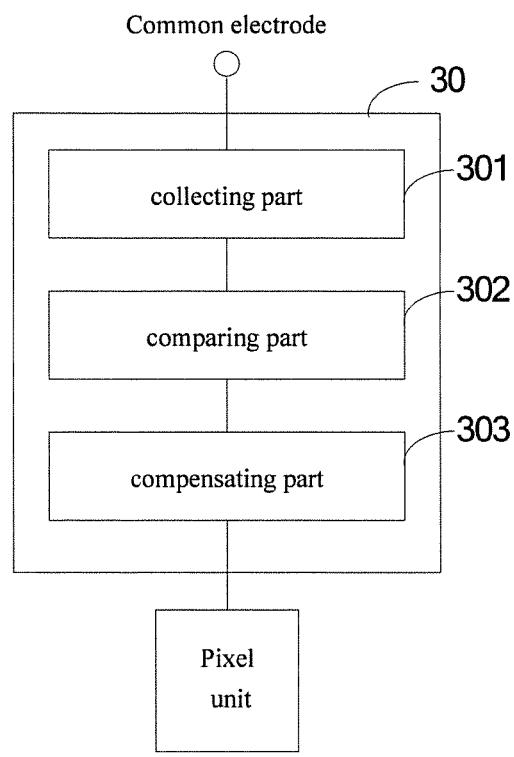
FIG. 4 shows a structural schematic view of a feedback circuit according to an embodiment of the present disclosure.

FIG. 4 shows a schematic view of a feedback circuit 30 applied in a display device according to an embodiment of the present disclosure. The display device for example is the display device as shown in FIG. 1.

The feedback circuit 30 can comprise a collecting part 301, a comparing part 302 and a compensating part 303 connected sequentially. One end of the collecting part 301 is connected with the comparing part 302, the other end thereof is connected with common electrodes (e.g., 102, 104, 106) of the display device as shown in FIG. 1. One end of the compensating part 303 is connected with the comparing part 302, the other end thereof is connected with pixel units of the display device as shown in FIG. 1.

The collecting part 301 is configured to select two adjacent common electrodes and collect voltages of the two adjacent common electrodes. The comparing part 302 is configured to compare the collected voltages of the two adjacent common electrodes and obtain a comparison result. The compensating part 303 is configured to, when the comparison result meets a preset condition, compensate input voltages of pixel units in two pixel unit rows corresponding to the two adjacent common electrodes based on the comparison result, so as to enable the voltages applied on the pixel units in the two pixel unit rows to be consistent.

In this embodiment, when the comparison result obtained by the comparing part 302 does not meet the preset condition, it indicates that voltages of two adjacent common electrodes (e.g., 102 and 104) are the same or approximate. Hence, the display brightnesses of the pixel units in two pixel unit rows (e.g., 101 and 103) corresponding to the two adjacent common electrodes are approximate, which would not produce stripes. In such a case, another two adjacent common electrodes (e.g., 104 and 106) are reselected, and voltages of the other two adjacent common electrodes (e.g., 104 and 106) are collected and the steps as shown in FIG. 2 are continued.

In an embodiment, the comparing part 302 can be configured to calculate a difference value of the voltages of the two adjacent common electrodes, and feed back the difference value of the voltages to the compensating part 303.

In this embodiment, the comparing part 302 comparing the two collected voltages can comprise calculating a difference value of the voltages of the two adjacent common electrodes 102 and 104. For example, assuming that the collected voltages of the common electrodes 102 and 104 are −1V and −0.5V respectively, then the calculated voltage difference value is 0.5V.

In an embodiment, the compensating part 303 is connected with data signal input ends of the pixel units. The compensating part 303 can be configured to, when the difference value of the voltages meets the preset condition, compensate input voltages of data signal input ends of pixel units in two adjacent pixel unit rows corresponding to the two adjacent common electrodes based on the difference value of the voltages, so as to enable the voltages applied on the pixel units in the two adjacent pixel unit rows to be consistent.

In this embodiment, the compensating part 303 compensates input voltages of data signal input ends of the pixel units in two pixel unit rows (e.g., 101 and 103) corresponding to the two adjacent common electrodes (e.g., 102 and 104) based on the difference value of the voltages obtained by the comparing part 302, so as to enable the voltages applied on the pixel units in the two pixel unit rows (e.g., 101 and 103) to be consistent, thereby enabling the display brightnesses of the pixel units in the two pixel unit rows (e.g., 101 and 103) to be the same, so as to avoid stripes. Compensating input voltages of pixel units in the two pixel unit rows (e.g., 101 and 103) can comprise compensating the input voltages of the pixel units in one (e.g., 101) of the two pixel unit rows, and can also comprise compensating input voltage of pixel units in the other (e.g., 103) of the two pixel unit rows, and can further comprise compensating the input voltages of the pixel units in the two pixel unit rows 101 and 103 simultaneously. This is not defined specifically in the embodiments of the present disclosure, and can be set based on actual conditions.

To sum up, the feedback circuit according to an embodiment of the present disclosure can comprise a collecting part, a comparing part and a compensating part connected sequentially. One end of the collecting part is connected with the comparing part, the other end thereof is connected with the common electrodes. One end of the compensating part is connected with the comparing part, the other end thereof is connected with the pixel units. The collecting part selects two adjacent common electrodes and collects voltages of the two adjacent common electrodes. The comparing part compares the collected voltages of the two adjacent common electrodes, obtains a comparison result and feeds back the comparison result to the compensating part. The compensating part, when the comparison result meets the preset condition, compensates the input voltages of pixel units in two pixel unit rows corresponding to the two adjacent common electrodes, so as to enable the voltages applied on the pixel units in the two pixel unit rows to be consistent. Through the embodiments of the present disclosure, after compensation, the voltages at the two ends of the pixel units in two adjacent pixel unit rows would become consistent, so as to enable the display brightnesses of the pixel units in the two adjacent pixel unit rows to be the same, thereby avoiding stripes.

Figure 5:
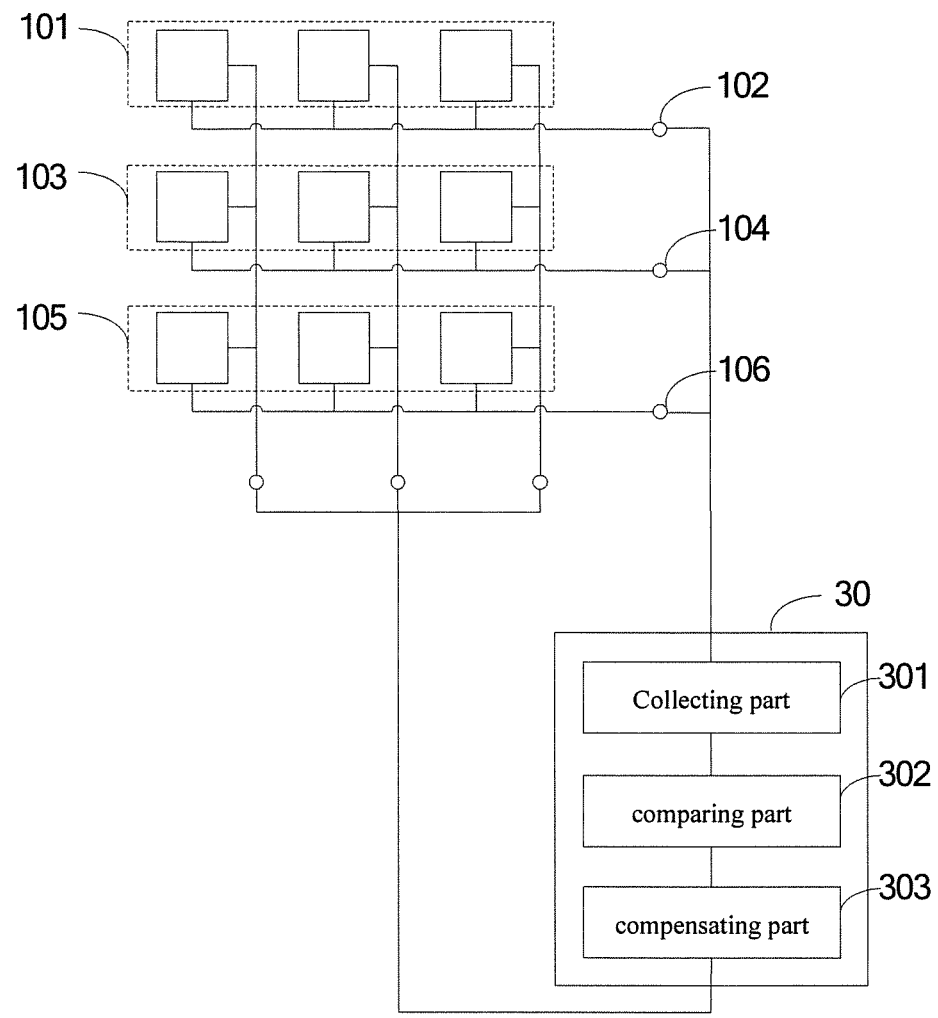
FIG. 5 shows a schematic view of a display device according to an embodiment of the present disclosure.

In an embodiment according to the present disclosure, a display device is provided. FIG. 5 shows a schematic view of a display device according to an embodiment of the present disclosure. The display device comprises the display device as shown in FIG. 1 and a feedback circuit 30 connected with it.

The display device can comprise a plurality of pixel unit rows, each pixel unit row comprising a plurality of pixel units. The display device further comprises common electrodes connected with the plurality of pixel unit rows correspondingly. The pixel units perform display based on the compensation voltage inputted by the feedback circuit 30.

The feedback circuit comprised by the display device can be for example the feedback circuit 30 as shown in FIG. 4. Two ends of the feedback circuit 30 can be connected to one end of a pixel unit and one end of a common electrode respectively. The collecting part 301 of the feedback circuit 30 is connected with the common electrodes 102, 104, 106, and the compensating part 303 of the feedback circuit 30 is connected with the pixel units in the pixel unit rows 101, 103, 105. In an embodiment, the collecting part 301 can select two adjacent common electrodes (e.g., 102 and 104) and collect voltages of the two adjacent common electrodes (e.g., 102 and 104). The collecting part 301 can transmit the collected voltages to the comparing part 302 which then compares the collected voltages of the two adjacent common electrodes 102 and 104. The comparing part 302, after obtaining a comparison result, feeds back the comparison result to the compensating part 303. The compensating part 303, when the comparison result meets the preset condition, compensates input voltages of pixel units in two pixel unit rows (e.g., 101 and 103) corresponding to the two adjacent common electrodes 102 and 104, so as to enable the voltages on the pixel units in the two pixel unit rows 101 and 103 to be consistent, thereby enabling, after voltage compensation, the display brightnesses of the pixel units in the two pixel unit rows 101 and 103 to be consistent (e.g., same or approximate), so as to avoid stripes. In addition, the compensating part 303, when the comparison result does not meet the preset condition, informs the collecting part 301 to reselect another two adjacent common electrodes. In such a case, the collecting part 301 is further configured to, when the comparison result does not meet the preset condition, reselect another two adjacent common electrodes and collect voltages of the reselected two adjacent common electrodes.

In this embodiment, as shown in FIG. 4, the feedback circuit 30 comprises a collecting part 301, a comparing part 302 and a compensating part 303 connected sequentially. The common electrodes in the display device are connected to the collecting part 301 in the feedback circuit 30, the pixel units in the display device are connected to the compensating part 303 in the feedback circuit 30. The feedback circuit 30 collects and compares voltages of two adjacent common electrodes in the display device, and compensates voltages of the pixel units in the display device based on the comparison result. The pixel units in the display device perform display based on the compensation voltages inputted by the feedback circuit 30. Since the feedback circuit has compensated the voltages inputted to the pixel units, voltages of the pixel units in two adjacent pixel unit rows after compensation are the same, thereby enabling the display brightnesses of the pixel units in the two adjacent pixel unit rows to be the same, so as to avoid stripes.

To sum up, the display device according to an embodiment of the present disclosure comprises a feedback circuit, and the pixel units in the display device perform display based on the compensation voltages inputted by the feedback circuit. Through the embodiments of the present disclosure, the display brightnesses of the pixel units in two adjacent pixel unit rows are the same, thereby avoiding stripes.

In an embodiment according to the present disclosure, an IC circuit is provided. The IC circuit comprises a feedback circuit. The feedback circuit for example is the feedback circuit 30 as shown in FIG. 4.

In this embodiment, the feedback circuit 30 comprises a collecting part 301, a comparing part 302 and a compensating part 303 connected sequentially. Two ends of the feedback circuit 30 are connected with the pixel units and the common electrodes of the display device respectively. The feedback circuit 30 collects voltages of two adjacent common electrodes in the display device and compares them, and then compensates voltages of the pixel units in the display device based on the comparison result, so as to enable the voltages applied on the pixel units in two adjacent pixel unit rows to be consistent, thereby avoiding stripes.

To sum up, the IC circuit according to an embodiment of the present disclosure comprises a feedback circuit. The feedback circuit comprises a collecting part, a comparing part and a compensating part connected sequentially. The feedback circuit enables the voltages applied on the pixel units in two adjacent pixel unit rows to be consistent. Through the embodiments of the present disclosure, the voltages on the pixel units in two adjacent pixel unit rows after compensation are consistent, so that the display brightnesses of the pixel units in two adjacent pixel unit rows are the same, thereby avoiding stripes.

The embodiments in this Description are all described in a progressive way, each embodiment stresses the differences from other embodiments, and the same or similar parts between the embodiments can make reference to each other.

Finally, it should be further noted that in this context, the relation terms such as first and second are only used for distinguishing one entity or operation from another entity or operation, without necessarily requiring or implying presence of any such actual relation or order between these entities or operations. Moreover, the term "comprise", "include" or any other variants thereof is intended to encompass nonexclusive inclusion, thereby enabling a process, a method, a product or a device that includes a series of elements to include not only those elements but also other elements not listed explicitly, or further include elements inherent for such a process, method, product or device. In the absence of more limitations, an element defined by the wording "including an . . . " does not exclude presence of another same element in the process, method, product or device that includes the element.

The display control method, the feedback circuit, the display device and the IC circuit provided by the present disclosure have been introduced in detail above. Specific examples have been applied herein to set forth the principles and implementations of the present disclosure. The above explanations on embodiments are merely helpful in understanding the method of the present disclosure and the core concept thereof. Meanwhile, for the ordinary skilled person in the art, modifications can be made to both the specific implementation and application scope according to the concept of the present disclosure. To sum up, contents of this Description should not be interpreted as limitations to the present disclosure.

The invention claimed is:

1. A display control method applied in a display device, the display device comprising a plurality of pixel unit rows and a plurality of common electrodes connected with the plurality of pixel unit rows correspondingly, each pixel unit row comprising a plurality of pixel units, the method comprising:
   selecting two adjacent common electrodes of the plurality of common electrodes;
   collecting voltages of the two adjacent common electrodes;
   comparing the collected voltages of the two adjacent common electrodes and obtaining a comparison result;
   when the comparison result meets a preset condition, compensating input voltages of pixel units in two pixel unit rows of the plurality of pixel unit rows corresponding to the two adjacent common electrodes based on the comparison result, so as to enable the voltages applied on the pixel units in the two pixel unit rows to be consistent; and
   when the comparison result does not meet the preset condition, reselecting another two adjacent common electrodes of the plurality of common electrodes, and performing the collecting step, the comparing step and the compensating step.

2. The method according to claim 1, wherein comparing the collected voltages of the two adjacent common electrodes and obtaining a comparison result comprises:
   calculating a difference value of the voltages of the two adjacent common electrodes.

3. The method according to claim 2, wherein compensating input voltages of pixel units in two pixel unit rows of the plurality of pixel unit rows corresponding to the two adjacent common electrodes based on the comparison result comprises:
   compensating input voltages of data signal input ends of pixel units in the two pixel unit rows corresponding to the two adjacent common electrodes based on the difference value of the voltages.

4. The method according to claim 1, wherein compensating input voltages of pixel units in two pixel unit rows of the plurality of pixel unit rows corresponding to the two adjacent common electrodes based on the comparison result comprises:
   compensating input voltages of pixel units in one of the two pixel unit rows, or
   compensating input voltages of pixel units in the two pixel unit rows simultaneously.

5. The method according to claim 1, wherein the preset condition is that, the difference value of the voltages of the two adjacent common electrodes is non-zero, or, an absolute value of the difference value of the voltages of the two adjacent common electrodes is within a predetermined range.

6. The method according to claim 5, wherein the predetermined range is between 0.3V ands V.

7. A feedback circuit applied in a display device, the display device comprising a plurality of pixel unit rows and a plurality of common electrodes connected with the plurality of pixel unit rows correspondingly, each pixel unit row comprising a plurality of pixel units, the feedback circuit comprising:
   a collecting part configured to select two adjacent common electrodes of the plurality of common electrodes, and collect voltages of the two adjacent common electrodes;
   a comparing part configured to compare the collected voltages of the two adjacent common electrodes and obtain a comparison result; and
   a compensating part configured to, when the comparison result meets a preset condition, compensate input voltages of pixel units in two pixel unit rows of the plurality of pixel unit rows corresponding to the two adjacent common electrodes based on the comparison result, so as to enable the voltages applied on the pixel units in the two pixel unit rows to be consistent;

wherein the collecting part is further configured to, when the comparison result does not meet the preset condition, reselect another two adjacent common electrodes of the plurality of common electrodes, and collect voltages of the reselected other two adjacent common electrodes.

8. The feedback circuit according to claim 7, wherein comparing the collected voltages of the two adjacent common electrodes comprises calculating a difference value of the voltages of the two adjacent common electrodes.

9. The feedback circuit according to claim 8, wherein the compensating part is connected with data signal input ends of the plurality of pixel units; and wherein the compensating part is configured to compensate input voltages of data signal input ends of pixel units in two pixel unit rows of the plurality of pixel unit rows corresponding to the two adjacent common electrodes based on the difference value of the voltages, so as to enable the voltages applied on the pixel units in the two pixel unit rows to be consistent.

10. The feedback circuit according to claim 7, wherein compensating input voltages of pixel units in two pixel unit rows of the plurality of pixel unit rows corresponding to the two adjacent common electrodes based on the comparison result comprises compensating input voltages of pixel units in one of the two pixel unit rows, or compensating input voltages of pixel units in the two pixel unit rows simultaneously.

11. The feedback circuit according to claim 7, wherein the preset condition is that, the difference value of the voltages of the two adjacent common electrodes is non-zero, or, an absolute value of the difference value of the voltages of the two adjacent common electrodes is within a predetermined range.

12. A display device, comprising:
a plurality of pixel unit rows, each pixel unit rows comprising a plurality of pixel units;
a plurality of common electrodes connected with the plurality of pixel unit rows correspondingly; and
the feedback circuit as claimed in claim 7;
wherein the plurality of pixel units perform display based on compensation voltages inputted by the feedback circuit.

13. An IC circuit, comprising the feedback circuit as claimed in claim 7.

* * * * *